United States Patent [19]

Colome et al.

[11] 4,091,875
[45] May 30, 1978

[54] DEVICE FOR EXTINGUISHING A LIQUID-FUEL FIRE BY ISOLATION

[75] Inventors: Jacques Colome, Manosque; Alain Duchene, Pierrevert; Jean Regnier, Manosque, all of France

[73] Assignee: Commissariat a l'Energie Atomique, Paris, France

[21] Appl. No.: 707,767

[22] Filed: Jul. 22, 1976

[30] Foreign Application Priority Data

Jul. 31, 1975 France .............................. 75 23956
Jul. 5, 1976 France .............................. 76 20522

[51] Int. Cl.² ............................................ A62C 7/00
[52] U.S. Cl. ...................................... 169/49; 220/1 C;
220/340; 239/121; 169/54
[58] Field of Search ................ 176/38; 220/1 C, 340,
220/337; 169/48, 49, 54; 62/291; 126/383, 385;
239/121, 122

[56] References Cited

U.S. PATENT DOCUMENTS 1,584,175  5/1926  Irons ..................................... 220/1 C
2,925,082  2/1960  Brownrigg ........................... 126/383

FOREIGN PATENT DOCUMENTS 2,185,153  12/1973  France.
1,608,027  10/1970  Germany.

Primary Examiner—John J. Love
Attorney, Agent, or Firm—Cushman, Darby & Cushman

[57] ABSTRACT

The device comprises at least one receptacle for collecting an accidental outleakage of liquid fuel and especially liquid sodium at high temperature. The receptacle is fitted with a cover which is provided with sloping channels for the flow of the liquid fuel and with openings through which it passes to the base of the channels. The openings are closed by retractable shutters which withdraw under the pressure of the liquid fuel within the channels and close automatically after it has flowed into the receptacle.

14 Claims, 8 Drawing Figures

DEVICE FOR EXTINGUISHING A LIQUID-FUEL FIRE BY ISOLATION

This invention relates to a device for rapidly extinguishing an ignited liquid fuel by isolating this latter from the surrounding air in a very short time and is more especially applicable to the case of outleakage of a flat stream of liquid sodium at high temperature, this outleakage being produced accidentally by a circulation system which forms part of a nuclear installation and especially a fast reactor.

It is known that in reactors of this type, the removal of heat generated by the fission reaction within the reactor core is carried out by continuous circulation of a liquid metal and more generally sodium which is brought to a high temperature of the order of 500° to 600° C at the reactor core outlet; the sodium which has become radioactive transfers its heat to a second non-radioactive sodium circuit within primary heat exchangers. The secondary sodium in turn passes through steam generators outside the reactor, the steam thus produced being finally expanded within the turbines of an installation for the production of electric power.

It is accordingly apparent that, especially in high-power reactors at present under construction, the volumes of sodium which are necessary and similarly the dimensions of the ducts and piping used for conveying the sodium within the installation must be of particularly high value. Failure of one of these ducts and resultant outleakage of a not-negligible quantity of hot sodium is a potential hazard which cannot be wholly excluded. It is consequently important to provide means whereby the sodium can be recovered almost immediately and isolated from the oxygen which is present in the surrounding air in order to prevent ignition of the sodium, increases in temperature and pressure within the building which contains the installation and the production of aerosols which would have a harmful effect both on the operating personnel and on their environment. In particular, it is advisable to ensure that, at the time of accidental leakage resulting in partial ignition of the liquid fuel, this latter can be very rapidly collected in a suitable extinguishing device in which the ignited portion will be extinguished almost instantaneously without any possibility of propagation of the fire to the total volume of the leakage detected.

The present invention relates to a device for extinguishing a fire of sodium or of any other fuel in liquid form and in flat streams which meets the requirements set forth in the foregoing and is more especially although not exclusively applicable within the purview of the safety requirements of a nuclear installation.

To this end, the device under consideration comprises at least one bottom receptacle for collecting the liquid fuel and a top cover for closing the receptacle, said cover being provided with sloping channels for the flow of the liquid fuel and with openings through which said liquid passes to the base of said channels. The device is distinguished by the fact that said openings are closed by retractable shutters which withdraw under the pressure of the liquid within the channels and close automaticaly after said liquid has flowed into the receptacle.

In accordance with a particular feature of the invention, the top cover is constituted by a plurality of adjacent plates which are slightly bent so that each plate forms a wide-angle dihedron, the interior of which is directed towards the bottom wall of the receptacle, said plates being arranged alternately at two levels which are relatively displaced in the direction at right angles to said bottom wall so that one of the openings for the flow of liquid fuel is delimited between the outer edges of two successive plates at each of these levels.

As an advantageous feature, the plates of the cover are rigidly fixed in position with respect to the bottom wall of the receptacle by means of colunns which are secured against said bottom wall and support said plates at the height of each of the two levels in succession. Preferably, the columns carrying the plates are fitted with a bearing shelf for said plates which are traversed by columns, said plates being maintained against said shelves by means of transverse locking-pins engaged in holes of elliptical shape formed in the columns so as to freely permit differences in expansion resulting from the temperature of the liquid fuel.

In accordance with another characteristic feature of the invention, the underface of each plate of the cover which is located at the upper level is provided in the vicinity of its free edge with an added back-plate provided with a bent portion having an upwardly directed extremity, the top edge of said bent portion being intended to form a pivotal axis for at least one retractable shutter. As an advantageous feature, each shutter is constituted by a flat sheet-metal element provided at the top end with a rounded edge which covers the edge of the bent portion of the added back-plate.

In accordance with yet another characteristic feature, the plates of the cover in each of the two levels overlap to partial extent in such a manner as to ensure that the shutters carried by the back-plates of the upper level rest under the action of their own weight against the extremities of the plates of the lower level when no liquid fuel is present within the channels delimited by said plates.

Moreover and in a particular embodiment of the invention in which the receptacle has a parallelepipedal volume having vertical sides, the edges of the dihedrons formed by the plates of the cover extend in a direction parallel to each other and to two opposite sides of the receptacle, the retractable shutters associated with each plate of the upper level are constituted by a series of contiguous sheet-metal elements along the length of the shutter, one shutter out of three being provided with two lateral extensions overlapping the adjacent edges of the two adjacent sheet-metal elements so as to ensure that the liquid fuel which flows into any region of a channel initiates the pivotal motion of one sheet-metal element or of three adjacent sheet-metal elements at a maximum so as to permit the flow of said liquid into the receptacle. This arrangement makes it possible in particular to effect partial closure of the openings through which the liquid fuel passes to the base of the channels by limiting the cross-section of said openings to the dimensions which are strictly necessary for the flow of liquid fuel, especially without causing the pivotal motion of all the shutters, with the result that the interior of the receptacle is isolated from the surrounding atmosphere in a more effective manner.

In accordance with another feature of the device under consideration, the plates of the upper level are covered by protection domes having steeper slopes than the plates in order to improve the flow of the liquid fuel in the direction of the channels and to prevent said plates from being subjected to high thermal stresses which would be liable to result in loss of leak-tightness of the system of closure by means of shutters.

A further improvement of the device under consideration is intended to increase to any desired extent the volume which is offered for the collection of the ignited liquid fuel. This improvement proves to be particularly useful, for example in order to adapt the device to sodium circuits of appreciable length such as a transfer duct or else to installations covering a large area. It can in fact be appreciated that it may prove a matter of difficulty to endow a single collecting receptacle with a length or an area which is comparable with that of the fluid circuit to be protected. This requirement is wholly satisfied by the design of a receptacle formed by a number of separate tanks fitted with suitable coupling means which permit a communication between said tanks in order to equalize the level of the liquid fuel collected within these latter on the principle of communicating vessels.

In accordance with a particular feature, the receptacle comprises a plurality of tanks which are juxtaposed along their lateral and/or longitudinal sides, said tanks being provided in pairs along their juxtaposed sides with coupling means for transferring the liquid contained in one tank to the other or conversely without any break in isolation of the tanks with respect to the exterior.

In a first embodiment, the juxtaposed sides of two adjacent tanks are lower in height, the free space formed above the juxtaposed sides being covered by a connecting member having a cross-section in the shape of an inverted U whose vertical sides extend downwards into the two tanks, the lower end of said vertical sides being placed at a level which is located between the bottom of the tanks and the top edge of the juxtaposed sides.

The U-shaped member which is thus placed over the juxtaposed edges of two adjacent tanks delimits with these latter a baffle which ensures a permanent connection without any break in isolation of the tanks, the vertical sides of the U-shaped member being intended to form a bearing element if necessary for the first rows of retractable shutters mounted on each side of said member within each tank aforesaid.

As an advantageous feature, the U-shaped member has an end-wall in the shape of a dihedron in order to facilitate the flow of liquid fuel towards either of the two juxtaposed tanks.

In another alternative embodiment, the juxtaposed edges of the two tanks are joined to each other by means of transverse ducts having elbowed end portions which penetrate into each tank. Preferably, the elbowed tubes pass through the juxtaposed sides of two adjacent tanks, are welded to one of said sides and connected to the other side by means of a bellows seal which provides compensation for differential expansions produced by the liquid fuel at different temperatures which is contained in the tanks.

Further properties of a fire-extinguishing device designed in accordance with the invention will become apparent from the following description of one exemplified embodiment which is given by way of indication without any limitation being implied, reference being made to the accompanying drawings, wherein.

Figure 1:
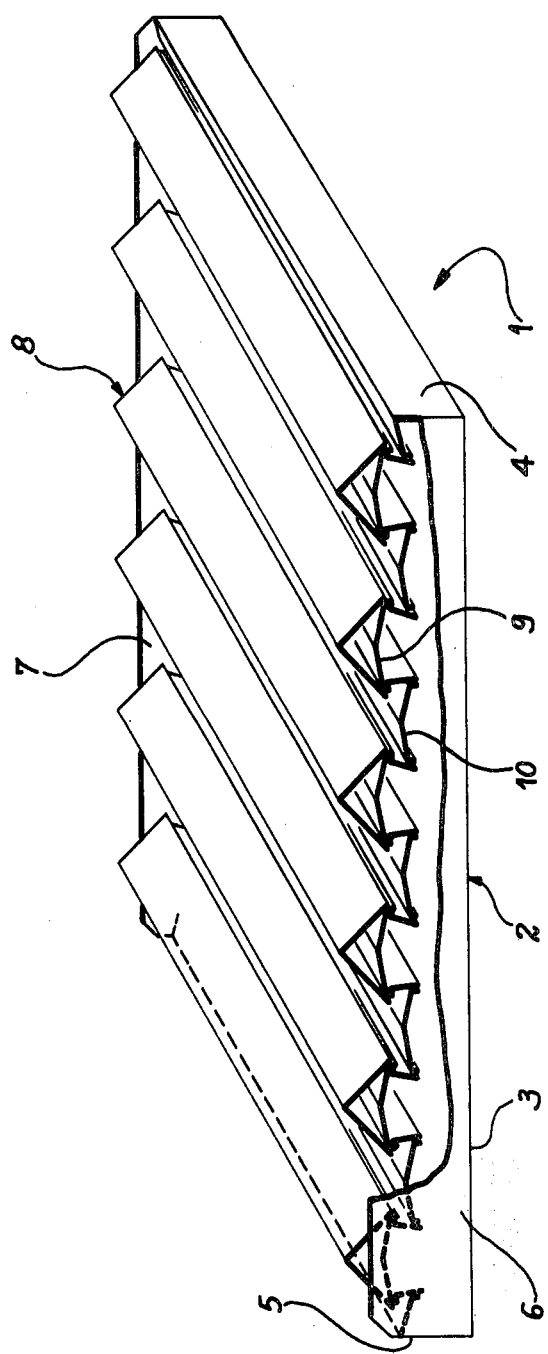
FIG. 1 is a diagrammatic view in perspective of the device under consideration which illustrates the general shape of the liquid-fuel receptacle and of the cover which closes said receptacle.

The fire-extinguishing device shown in FIG. 1 is primarily intended to collect any leakage, in the form of a flat stream or the like, of liquid sodium at high temperature discharged from a duct or pipe (not shown in the drawings) which forms part of a fast reactor installation. As will readily be understood, it would likewise be possible to contemplate any other application calling for the use of a fluid in the liquid state which is to be rapidly isolated in the event of leakage to the external atmosphere.

In this figure, the device which is generally designated by the reference 1 comprises a receptacle 2 having a generally parallelepipedal shape with a horizontal bottom wall 3 and four sides which are parallel to each other in pairs and designated respectively as 4 and 5, 6 and 7. This open-topped receptacle is usually closed by a cover 8 constituted by the juxtaposed assembly of successive plates located at two superposed levels which are adjacent to each other. In the accompanying drawings, said plates are designated by the reference numerals 9 and 10, whether they form part of one of the aforesaid levels or the other, a series of parallel channels being formed between the plates.

Figure 2:
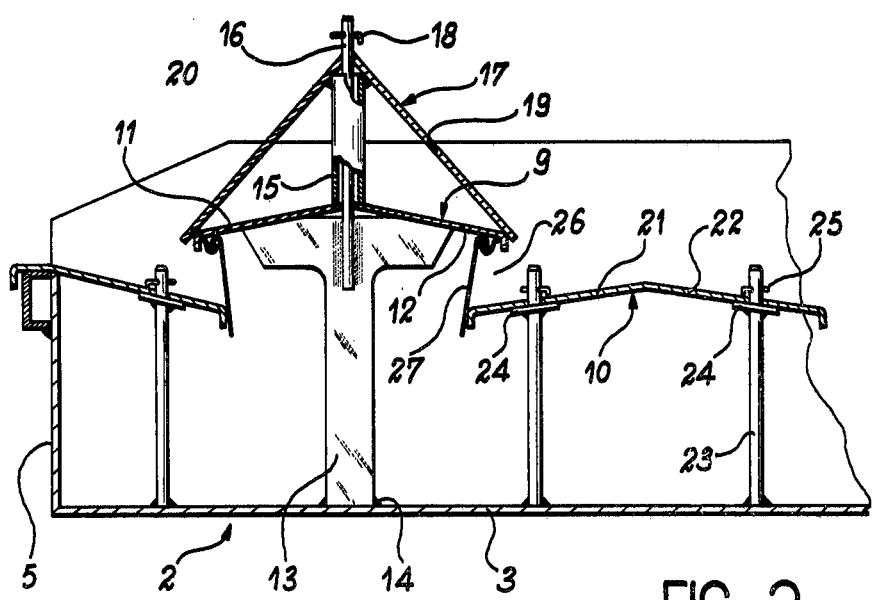
FIG. 2 is a detail view in transverse cross-section showing the plates which are arranged at two superposed levels in the cover of the receptacle.

As can be seen in greater detail in FIG. 2, the plates 9 and 10 aforesaid are each provided in the form of folded sheet-metal elements so as to constitute wide-angle dihedrons about an edge which extends in a direction parallel to the sides 4 and 5 of the receptacle 2. The plates 9 of the upper level thus have two sides 11 and 12 respectively which are inclined to the horizontal, superposed by means of posts extending at right angles to the bottom wall 3 of the receptacle 2 and welded against this latter by means of fillets 14. The plates 9 are provided at the upper end with an extension in the form of a tubular element 15 within which is mounted a column 16, there being engaged on said column a protection dome 17 having a triangular cross-section, said dome being secured by means of a transverse locking-pin 18. The lateral faces 19 and 20 of said dome are inclined to the horizontal at an angle of slope which is appreciably larger than that of the sides 11 and 12 of the plates 9, thereby ensuring more rapid flow of a flat stream of liquid sodium which falls onto the cover in the direction of the receptacle. Similarly, the plates 10 of the lower level have two sloping sides 21 and 22 and are supported at a suitable distance from the bottom wall 3 by means of vertical columns 23 provided with bearing shelves 24 against which they are applied, said plates being fixed in position by means of transverse locking-pins 25. As an advantageous feature and by reason of the high temperature of the sodium which falls onto said plates to be collected in the receptacle 2, the locking-pins 18 and 25 are engaged in bores formed in the columns 16 and 23, the cross-section of said bores being elliptical in order to permit of free expansion of the plates and of the protection domes.

Figure 3:
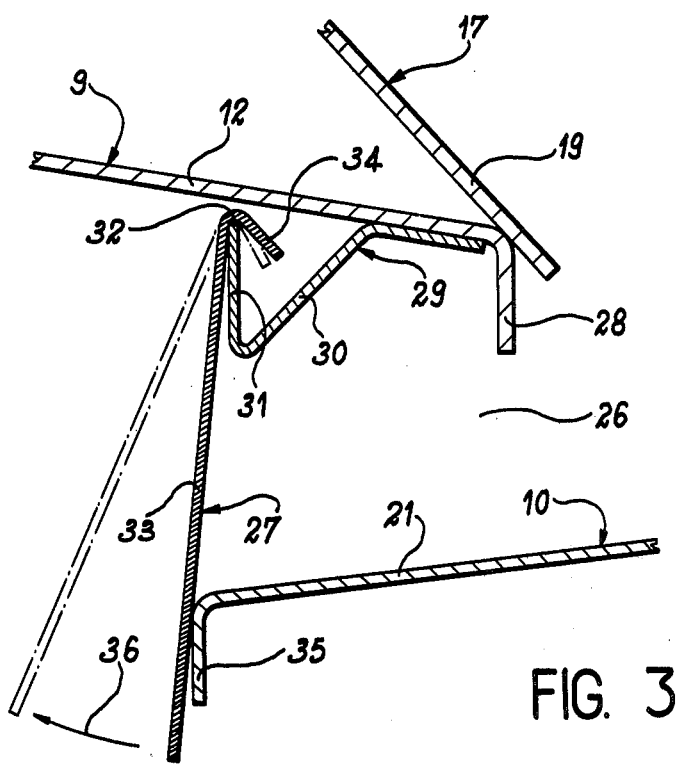
FIG. 3 is a detail view to an even larger scale and illustrating the profile of a shutter which closes the opening for the flow of liquid fuel between two adjacent plates located respectively at two different levels.

The plates 9 and 10 which are thus shaped and arranged in the cover 8 in two superposed levels delimit lateral openings 26 between said levels. Thus the liquid sodium which falls onto the cover can flow through said openings and be collected within the receptacle. However and in accordance with the invention, in order to isolate the interior of the receptacle with respect to the surrounding air, especially in order to limit the combustion of the liquid sodium collected, said openings 26 are usually closed by pivotal shutters 27 which are illustrated in greater constructional detail in FIG. 3.

As shown in this figure, the plates 9 of the cover which is located at the upper level are provided in particular with a turned-down outer edge 28, the underface of each plate which is directed towards the plates 10 being intended to support a back-plate 29, this latter being given a suitable shape especially in order to have an inclined portion 30 extended by a vertical portion 31, the end or top edge 32 of which extends parallel to the bottom wall 3 of the receptacle. Said top edge 32 thus constitutes a pivotal axis for the shutter 27 formed by a sheet-metal element 33, said element being provided at the top with a rounded edge 34 which is intended to fit over the edge 32 and thus permits suitable pivotal motion of said shutter. In the normal position, taking into account the partial overlap of the side 12 of the plate 9 and of the side 21 of the plate 10 which is placed underneath, the sheet-metal element 33 of the shutter 27 rests under the action of its own weight against the suitably bentback edge portion 35 of the plate 10. On the other hand, when sodium outleakage occurs and an indeterminate quantity flows in at the level of any opening 26 into the channel formed between the corresponding plates 9 and 10, the effort produced by the weight of said sodium causes the sheet-metal element 33 to pivot about the edge 32 in the direction of the arrow 36 shown in FIG. 3, the position of the shutter being accordingly represented in chain-dotted lines. The liquid sodium collected in the channel at the level of the opening 26 can thus flow into the interior of the receptacle 2. Once the flow has stopped, the shutter 27 returns to its initial position and again isolates the receptacle with respect to the external atmosphere.

Figure 4:
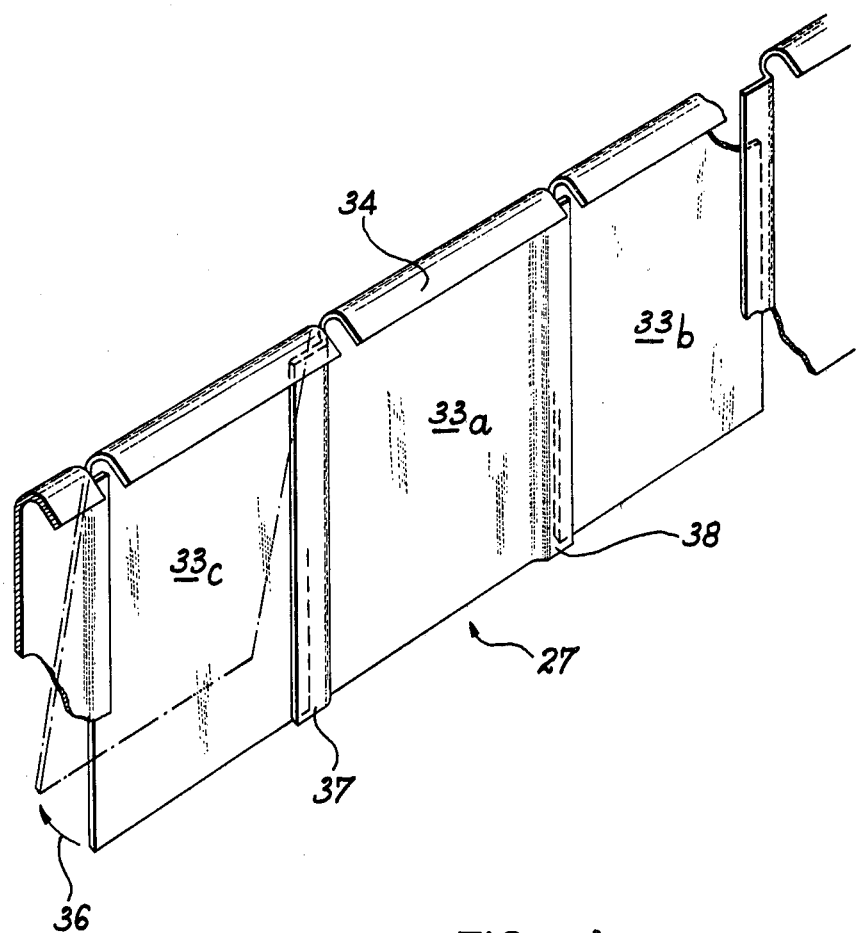
FIG. 4 is a view in perspective illustrating the particular construction of the shutters for closing the openings provided between the plates of the cover.

Referring again to FIG. 1, it is apparent that the plates 9 and 10 which constitute the closure cover 8 of the receptacle extend in a direction parallel to the sides 4 and 5 of this latter in a succession of parallel elements delimiting a corresponding number of channels and openings, each of these latter being associated with a shutter of the type described earlier. FIG. 4 accordingly illustrates in perspective the constructional detail of said shutters 27, these latter being intended to open only over that portion of their length which is strictly necessary to permit the quantity of sodium to flow into the receptacle without entailing the need for complete pivotal displacement of the entire shutter. This has the effect of improving the isolation of the internal volume of the receptacle. With this objective, the shutter 27 is formed by a series of adjacent sheet-metal elements arranged in sets of three such as the elements 33a, 33b and 33c. The central sheet-metal element 33a has two lateral extensions 37 and 38 which are intended to overlap the adjacent edges of the two elements 33b and 33c to a partial extent. It is apparent that, under these conditions and under the action of the weight of the sodium within any one channel, only one of the elements 33c or 33b will be caused to carry out a pivotal movement unless the effort is exerted against the element 33a, in which case this latter is accompanied in its movement by the two adjacent elements 33b and 33c. In all cases, maximum effectiveness of isolation of the receptacle remains ensured by virtue of the fact that the pivotal movement of the shutters is controlled solely by the flow of the sodium itself.

In the foregoing examples, the device which is illustrated comprises only a single receptacle for collecting the ignited liquid fuel which results from an accidental leakage. It is apparent, however, that the dimensions of a single receptacle of this type could not be adapted to a fluid circuit of substantial length or to an installation having a large area without resulting in prohibitive space requirements and capital outlay.

An improvement of the present invention accordingly consists in constituting the fuel-collecting receptacle by means of a number of juxtaposed tanks, with the result that the complete assembly can be given dimensions and shapes which are best suited to the geometry of the circuit or installation to be protected.

Figure 5:
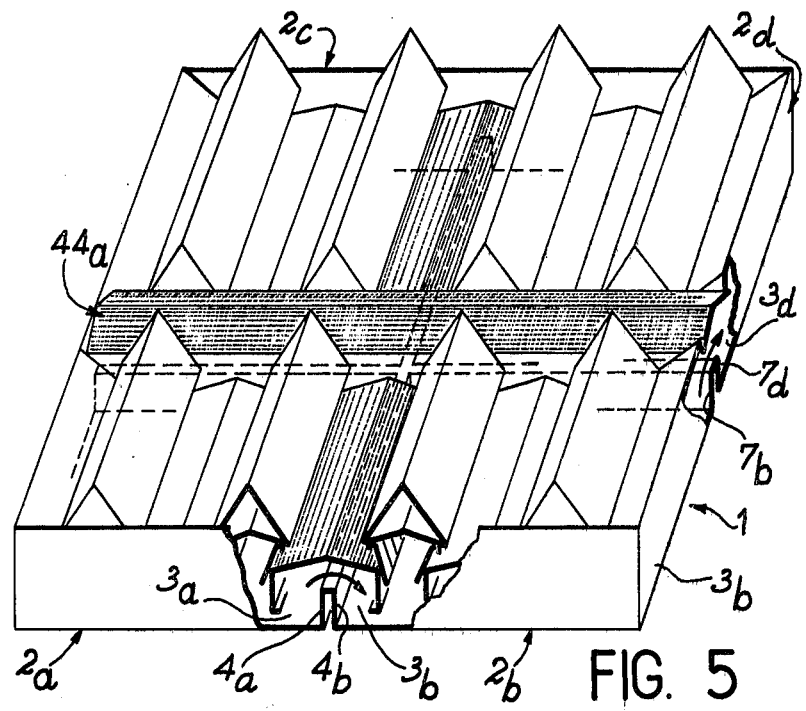
FIGS. 5 and 6 illustrate respectively in perspective and in part-sectional view to a larger scale one form of construction of a receptacle formed by a plurality of juxtaposed tanks joined together by suitable coupling means.
Figure 6:
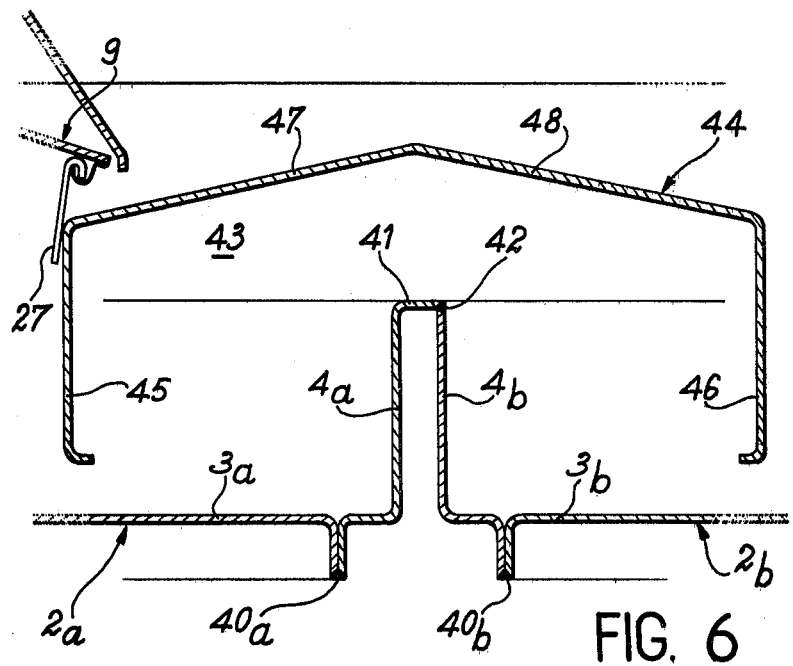

In FIGS. 5 and 6, it can be seen in particular that the receptacle is formed by four juxtaposed tanks designated respectively by the references 2a, 2b, 2c and 2d, the general structure of each tank being similar to that described earlier, provisions being made for a series of rows of retractable shutters joined together in pairs along certain lateral and longitudinal sides but any association other than that shown in FIG. 5 could in any case be contemplated. In accordance with the invention, the lateral sides 4a and 4b which are located opposite to two of the tanks aforesaid such as the tanks 2a and 2b, for example, are so arranged as to be lower in height with respect to the other sides. In consequence, the side 4a which is bent-back at the upper end 41 can be welded against the edge 42 of the side 4b, thus effecting the desired coupling. The sides 4a and 4b are preferably attached to the bottom walls 3a and 3b of the tanks by means of weld fillets 40a and 40b. This coupling between the two tanks leaves a free communication region 43 above the sides 4a and 4b and also comprises a covering member 44 having the general shape of an inverted U and having vertical sides 45 and 46 which extend downwards respectively into the tanks 2a and 2b to a level located between the bottom wall 3a or 3b of said tanks and the top edge of the sides 4a and 4b. In this manner, the liquid fuel collected in the tanks is permitted to flow out beneath the member 44 as it passes from one tank to the next over the sides 4a and 4b.

In FIG. 6, the structure of the different components employed is shown in greater detail. The vertical edge 45 of the U-shaped member is also adapted to cooperate with the first row of retractable shutters 27 carried by the plate 9 provided within the interior of the tank 2a, for example, it being understood that an arrangement of the same kind is adopted in the other tank. It should be noted that the endwall of said U-shaped member 44 is constituted by two flat portions 47 and 48 between which is formed a dihedron in such a manner as to ensure that the liquid fuel which falls onto this member can readily flow towards either of the two tanks which have thus been coupled together.

A coupling is effected in like manner between on the one hand the tanks 2a and 2c and on the other hand the tanks 2b and 2d by fitting over the juxtaposed sides of these latter a covering member 44a which is similar to the member 44 and performs the same function. As an advantageous feature, the member 44a can be provided on both faces of the dihedron with V-shaped ribs (not shown) which are placed alternately at two different levels in order to support respectively the opposite ends of the dihedrons 9 and 10.

It is readily apparent that the mode of coupling illustrated in FIGS. 5 and 6 makes it possible to cover any area desired by adding the requisite number of tanks in the appropriate directions. It is thus possible to add a plurality of tanks in the direction of the member 44a by extending said member of welding this latter to similar members. Tanks which are adjacent to the tanks 2a and 2b, or 2c and 2d, can likewise be placed in the perpendicular direction by placing a member 44a over the juxtaposed sides.

Figure 8:
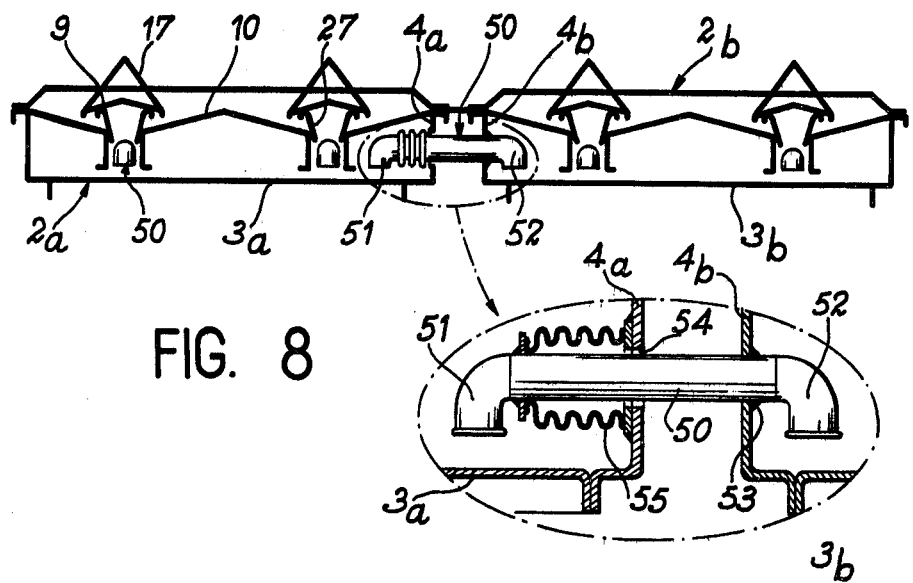
FIGS. 7 and 8 are views which are similar to FIGS. 5 and 6 but relate to another form of construction.
Figure 7:
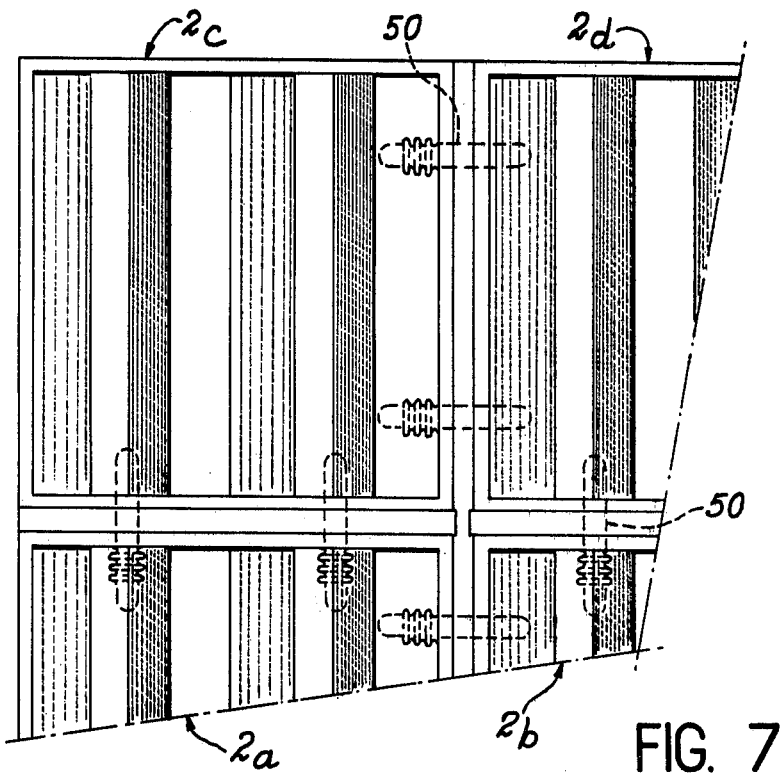

In another alternative form which is illustrated in FIGS. 7 and 8, the coupling between the tanks 2a and 2b is effected directly by means of tubes 50 passed through the parallel and opposite sides 4a and 4b of these two tanks, the ends 51 and 52 respectively of said tubes 50 being elbowed and directed towards the bottom walls 3a and 3b. In addition, in order to take into account possible differences in expansion resulting from different temperatures of the liquid fuel in either of said tanks, the tubes 50 are advantageously welded at 53 to one of the sides aforesaid, for example the side 4b of the tank 2b, and traverse the parallel side 4a of the tank 2a through an orifice 54, leak-tightness on assembly being ensured by surrounding that portion of the tube 50 which penetrates into the tank 2a by a compensation bellows seal 55 which is welded on the one hand against the tube 50 and on the other hand against the wall 4a.

There is thus provided a device for extinguishing by isolation a liquid fuel and especially sodium at high temperature which can be adapted to any rate of flow of liquid fuel recovered by the different channels between the plates of the cover, then by the receptacle after pivotal motion of a sufficient number of closure shutters, these latter being intended to return to the initial position immediately afterwards in order to ensure that the internal volume of said receptacle is again isolated. By way of indication, a device constructed in accordance with the invention and designed to absorb a flow rate in the vicinity of 1 metric ton per minute has led to the conclusion that only 32 kg of sodium had been consumed and that 7 kg had been emitted in the form of aerosols. Under the same conditions of temperature and with a receptacle which is open to the external environment, the same flow rate of sodium would result in the consumption of 600 kg, of which 240 kg would be in the form of aerosols.

It is readily apparent that the invention is not limited to the example of construction which has been more especially described with reference to the accompanying drawings but that it extends on the contrary to all alternative forms. In particular, the foregoing description brings out the fact that the sodium absorption capacity of the receptacle can be made variable at will as a function of the flow rates to be contemplated. This can be achieved simply by modifying either the number of shutters and the volume of the receptacle itself or the number of tanks or else both at the same time. Similarly, the flow of sodium can be controlled by judiciously calculating the angles of slope of the inclined plates which form the cover and the protection domes.

What we claim is:

1. A device for extinguishing a liquid-fuel fire by isolation comprising at least one bottom receptacle for collecting the liquid fuel and a top cover for closing the receptacle, said cover being provided with sloping channels for the flow of the liquid fuel and with openings through which said liquid fuel passes to the bottom of said receptacle wherein said openings are closed by retractable shutters which withdraw under the pressure of the liquid within the channels and close automatically after said liquid has flowed into said receptacle, said top cover being constituted by a plurality of adjacent plates which are slightly bent so that each plate forms a wide-angle dihedron, the interior of which is directed towards the bottom wall of the receptacle, said plates being arranged alternately at two levels which are relatively displaced in the direction at right angles to said bottom wall so that one of the openings for the flow of liquid fuel is delimited between the outer edges of two successive plates at each of these levels.

2. A device according to claim 1, wherein the plates of the cover are rigidly fixed in position with respect to the bottom wall of the receptacle by means of columns which are secured against said bottom wall and support said plates at the height of each of the two levels in succession.

3. A device according to claim 2, wherein the columns carrying the plates are each fitted with a bearing shelf for said plates which are traversed by the columns, said plates being maintained against said shelves by means of transverse locking-pins engaged in holes of elliptical shape formed in the columns so as to freely permit differences in expansion resulting from the temperature of the liquid fuel.

4. A device according to claim 1, wherein the underface of each plate of the cover which is located at the upper level is provided in the vicinity of its free edge with an added back-plate provided with a bent portion having an upwardly directed extremity, the top edge of said bent portion being intended to form a pivotal axis for at least one retractable shutter.

5. A device according to claim 4, wherein each shutter is constituted by a flat sheet-metal element provided at the top end with a rounded edge which covers the edge of the bent portion of the added back-plate.

6. A device according to claim 1, wherein the plates of the cover in each of the two levels overlap to a partial extent in such a manner as to ensure that the shutters carried by the back-plates of the upper level rest under the action of their own weight against the extremities of the plates of the lower level when no liquid fuel is present within the channels delimited by said plates.

7. A device according to claim 1 in which the receptacle has a parallelepipedal volume having vertical sides, the edges of the dihedrons formed by the plates of the cover being such as to extend in a direction parallel to each other and to two opposite sides of the receptacle, wherein the retractable shutters associated with each plate of the upper level are constituted by a series of contiguous sheet-metal elements along the length of the shutter, one shutter out of three being provided with two lateral extensions overlapping the adjacent edges of the two adjacent sheet-metal elements so as to ensure that the liquid fuel which flows into any region of a channel initiates the pivotal motion of one sheet-metal element or of three adjacent sheet-metal elements at a maximum so as to permit the flow of said liquid into said receptacle.

8. A device according to claim 1, wherein the plates of the upper level are covered by protection domes having steeper slopes than the plates.

9. A device according to claim 1 wherein the liquid fuel is sodium at high temperature.

10. A device according to claim 1, wherein the receptacle comprises a plurality of tanks which are juxtaposed along their lateral and/or longitudinal sides, said tanks being provided in pairs along their juxtaposed sides with coupling means for transferring the liquid contained in one tank to the other or conversely without any break in isolation of the tanks with respect to the exterior.

11. A device according to claim 10, wherein the juxtaposed sides of two adjacent tanks are lower in height, the free space formed above said juxtaposed sides being covered by a connecting member having a cross-secton in the shape of an inverted U whose vertical sides extend downwards into the two tanks, the lower end of said vertical sides being placed at a level which is located between the bottom of the tanks and the top edge of the juxtaposed sides.

12. A device according to claim 11, wherein the U-shaped member has an end-wall in the shape of a dihedron.

13. A device according to claim 10, wherein the juxtaposed edges of the two tanks are joined to each other by means of transverse ducts having elbowed end portions which penetrate into each tank.

14. A device according to claim 13, wherein the elbowed tubes pass through the juxtaposed sides of two adjacent tanks, are welded to one of said sides and connected to the other side by means of a compensation bellows seal.

* * * * *